United States Patent [19]
Hill, Jr.

[11] Patent Number: 5,225,464
[45] Date of Patent: Jul. 6, 1993

[54] INTUMESCENT COATING AND METHOD OF MANUFACTURE

[75] Inventor: John E. Hill, Jr., Somersworth, N.H.

[73] Assignee: Material Technologies & Sciences, Inc., Ketchum, Id.

[21] Appl. No.: 861,530

[22] Filed: Apr. 2, 1992

[51] Int. Cl.$^5$ .............. C08K 5/3492; C08K 9/10; C09K 21/12; C07D 251/70

[52] U.S. Cl. .............. 524/100; 252/606; 252/609; 523/204; 523/210; 524/416; 524/494; 524/496; 544/195

[58] Field of Search .............. 544/195; 524/416, 100, 524/494, 496; 523/204, 210; 252/606, 609

[56] References Cited

U.S. PATENT DOCUMENTS

| | | | |
|---|---|---|---|
| 2,984,640 | 5/1961 | Kaplan | 544/195 |
| 3,635,970 | 1/1972 | Fessler et al. | 544/195 |
| 3,658,579 | 4/1972 | Ottinger et al. | 524/514 |
| 4,080,501 | 3/1978 | Leman et al. | 544/195 |
| 4,115,351 | 9/1978 | Joh | 524/416 |
| 4,255,303 | 3/1981 | Keogh | 524/399 |

OTHER PUBLICATIONS

Bhatnagar: Fire Retardant Formulations Handbook—vol. 1 Progress in Fire Retardancy Series—p. 25 (1972).

*Primary Examiner*—Veronica P. Hoke
*Attorney, Agent, or Firm*—Lieberman & Nowak

[57] ABSTRACT

Compositions useful in forming intumescent coatings are provided. These compositions are based on a reaction between phosphoric acid, melamine and monoammonium phosphate, which renders the monoammonium phosphate substantially less soluble while retaining its low dissolution temperature. Intumescent coatings utilizing the above-technology are disclosed as is a method of manufacturing these coatings.

9 Claims, No Drawings

INTUMESCENT COATING AND METHOD OF MANUFACTURE

BACKGROUND OF THE INVENTION

The subject invention relates to an intumescent coating and manufacturing method therefor, in which the fire retardant coating produces a hard, vitreous, insulating char when exposed to heat and flame.

Intumescent coatings have been used in the past with mixed results. In particular, known fire retardant intumescent coatings tend to form a light, fluffy char that is highly susceptible to displacement from coated surfaces during turbulent air movements induced by a fire. This limits a coating's protectiveness and renders it unsuitable for use under certain fire conditions. Likewise, such unreliable performance results in an inability to consistently pass testing requirements.

Coatings that produce a hard char, capable of resisting turbulent air flow, typically contain organic solvents, cross linked organic polymers, and expensive polyphosphates or pyroposphates as a source of phosphoric acid. The resultant coatings, while generating a hard char, are expensive and often difficult to handle and apply.

Accordingly, there has been a long felt need for an inexpensive intumescent coating that resists removal by fire induced turbulence.

Flame resistant intumescent paints have been described (see, U.S. Pat. Nos. 4,198,328; 4,879,320; and 4,247,435). However, monoammonium phosphate has not been used in such coatings because it was thought to have unfavorable properties. Monoammonium phosphate is highly water soluble, which has the effect of causing it to leach out of the coating upon contact with water. When this occurs, no phosphoric acid is left to dehydrate the pentaerythritol and produce a carbon char. This motivated the art to teach away from the use of monoammonium phosphate, especially since improved durability was obtained from pyrophosphates and polyphosphates, such as the commercially successful PHOSCHEK 30 manufactured by Monsanto. Unfortunately, although pyrophosphates and polyphosphates produce water durable coatings, their decomposition temperature is such that a reduced amount of char is formed. This results in either reduced fire protection or the increased expense of using more material to achieve adequate protection.

The subject manufacturing method produces an intumescent coating with a strong, turbulence resistant char, water resistance and economic viability. This is possible by reacting orthophosphoric acid, melamine and monoammonium phosphate to effectively coat the monoammonium phosphate with a water resistant barrier. By employing such a reaction, the benefits of monoammonium phosphate can be obtained, together with the advantages associated with expensive polyphosphates.

Thus, the subject invention thus provides an unexpected advantage over known intumescent coatings and fulfills a long felt need for a cost effective intumescent coating.

SUMMARY OF THE INVENTION

The subject invention provides a composition useful in producing a fire retardant substance which comprises the reaction product of phosphoric acid, melamine and monoammonium phosphate. This composition is useful in a variety of fire retarding applications including the formation of an intumescent composition which comprises the reaction product of phosphoric acid, melamine and monoammonium phosphate, with chlorinated paraffin, pentaerythritol and an adhesive.

The subject invention also provides a method of manufacturing the above composition. This comprises contacting phosphoric acid with melamine and then adding monoammonium phosphate. The above intumescent coating can be formed by the addition of chlorinated paraffin, pentaerythritol and an adhesive.

DETAILED DESCRIPTION OF THE INVENTION

Intumescent compositions of the subject invention swell and vitrify upon exposure to flame. Upon vitrifying, a hard char forms which resists removal by turbulence and resists penetration by flame and heat. The formation of vitreous char is favored when materials that decompose to form dehydrating acids, such as phosphates, polyphosphates or pyrophosphates, are utilized.

The basis for the composition of the subject invention is the reaction product of phosphoric acid, melamine and monoammonium phosphate, which may be combined with pentaerythritol, chlorinated paraffin and an adhesive to form a superior intumescent coating.

The three reactants usually comprise from about 15% to about 95% by weight monoammonium phosphate, from about 0.1% to about 5% by weight phosphoric acid, and from about 4.0% to about 40% by weight melamine of the total weight of the reactants.

The following are preferred formulations:

| Material | Parts | % by Weight |
|---|---|---|
| Composition No. 1 | | |
| Deionized Water | 240.00 | 15.70 |
| Orthophosphoric Acid | 5.25 | .34 |
| Alkylaryl Polyether | 3.00 | .20 |
| Potassium Tripolyphosphate | 3.00 | .20 |
| Paraffinic Mineral Oil | 2.25 | .15 |
| N-Methyl Pyrrolidone | 4.50 | .29 |
| Propylene Glycol | 10.50 | .69 |
| Melamine | 288.00 | 18.84 |
| Titanium Dioxide | 36.00 | 2.36 |
| Monoammonium Phosphate | 468.00 | 30.62 |
| Pentaerythritol | 135.00 | 8.82 |
| Chlorinated Paraffin | 72.00 | 4.71 |
| Poly (Vinyl Acetate) Resin | 252.00 | 16.49 |
| Sodium Polycarboxylic Acid | 9.00 | .59 |
| | 1528.50 | 100.00 |
| Composition No. 2 | | |
| Deionized Water | 240.00 | 19.49 |
| Orthophosphoric Acid | 5.25 | .43 |
| Alkylaryl Polyether | 3.00 | .24 |
| Potassium Tripolyphosphate | 3.00 | .24 |
| Paraffinic Mineral Oil | 2.25 | .18 |
| N-Methyl Pyrrolidone | 4.50 | .37 |
| Propylene Glycol | 10.50 | .85 |
| Melamine | 288.00 | 23.39 |
| Monoammonium Phosphate | 468.00 | 38.00 |
| Pentaerythritol | 135.00 | 10.96 |
| Chlorinated Paraffin | 72.00 | 5.85 |
| | 1231.50 | 100.00 |

Composition No. 2 may be mixed together into a pigment dispersion, then dried and screened through a 325 U.S. mesh screen. Composition No. 2 in this state will be subsequently referred to as "FR Additive".

When the first twelve components of Composition No. 1 and first eleven components of Composition No.

2 are mixed in the order listed, an in situ reaction occurs. Although all of the components listed are not required to produce a functional intumescent coating, they represent the best mode currently employed. The critical reaction is that between phosphoric acid, melamine and monoammonium phosphate to produce a "coated" monoammonium phosphate that is resistant to dissolution in water, yet retaining a low dissolution temperate (155° C.) (the melamine pyrophosphate produced greatly retards the dissolving action of water). Preferably, this exothermic reaction occurs in situ. Since most monoammonium phosphate remains unreacted, the desired properties (e.g., lower decomposition temperature) are retained.

| Composition No. 3 | | |
| --- | --- | --- |
| Material | Parts | % by Weight |
| FR Additive (Composition No. 2) | 400.00 | 40.00 |
| High Melt Temperature Fiber | 100.00 | 10.00 |
| Resin (Adhesive) | 500.00 | 50.00 |
| | 1000.00 | 100.00 |

In this composition, the high melt temperature fiber may be glass or ceramic fiber. The adhesive may be epoxy, polyester, or any suitable adhesive known to those skilled in the art.

FR Additive may also be added to existing formulations of gel coats, sheet molding (SMC), bulk molding compounds (BMC), and various foams, including syntactic foams, thereby decreasing their flame response.

Monoammonium phosphate, which in solution provides from about 10% to about 60% available phosphoric acid, is the preferred carbon charring source. The preferred amount of monoammonium phosphate (fertilizer grade) is from about 9% to about 60% by weight of composition. Monoammonium phosphate offers the advantage of being usable in the form of low cost fertilizer grade ammonium phosphate (chemical formula $NH_4HPO_4$). Other materials that act as charring agents, and may be substituted for monoammonium phosphate, are boric acid and its salts, as well as the salts of sulfuric acid.

Melamine, preferably in powdered form, and present in an amount ranging from about 2.5% to about 18.0% by weight of the composition, is the preferred blowing agent (i.e., it sublimes to a gas in the presence of heat). It is commercially available from American Cyanamid and BASF (chemical formula $C_3H_6N_6$).

Chlorinated paraffin containing at least 70% chlorine, is the preferred halogen flame reducer and is commercially available under the tradename CHLOREZ 70, manufactured by Dover Chemical. Chlorinated paraffin is typically present in an amount ranging from about 1.4% to about 9.0% by weight of the composition where it functions as a flame retardant and smoke suppressant.

Pentaerythritol is the preferred carbon source, and is typically present in an amount ranging from about 3.0% to about 12% by weight of the composition. Pentaerythritol may be a monomer, dimer, trimer, or polymer. Concentration ranges listed are for pentaerythritol monomer. However, proper ranges for the various polymeric forms are readily determinable by one skilled in the art. Pentaerythritol is commercially manufactured under the tradename PE-200, by Hercules Corporation.

The adhesive or resin serves to bind the particulate components together, and serves as a film to create the carbon foam that occurs during the application of heat. Typically, the adhesive may be poly(vinyl acetate), poly(vinyl ester), polyester or epoxy resin.

Poly(vinyl acetate) may be incorporated into the formulation in the form of an emulsion and is typically present in an amount ranging from about 12% to about 29% by weight of the composition, depending on the solids content. The preferred amount of poly(vinyl acetate) is between 10% and about 40% by weight. Most preferably, poly(vinyl acetate) is present at about 20% by weight. Poly(vinyl acetate) is useful as a film former and carrier. One suitable poly(vinyl acetate) is sold under the tradename RESYN, by National Starch and Chemical Corporation.

Epoxy resin may be incorporated into the formulation in the form of a neat resin. Typically, epoxy resin is present in the range of about 10% to about 45% by weight of the composition. Most preferably, the epoxy resin is that sold under the tradename EPON. However, other suitable epoxy resins may also be used that are characterized by the presence of an epoxide functionality $—CH—CH_2)$. The choice of resin is readily determinable by one skilled in the art.

When using epoxy resin, an accelerator may be used. The accelerator is preferably present in the range of from about 0.35% to about 5% by weight of the composition. Any commercially available accelerator, and particularly tri(dimethylaminomethyl) phenol may be utilized. The tradename product ARALDITE DY 064 is a preferred tri(dimethylaminomethyl) phenol.

In a preferred epoxy embodiment, a diluent is present in the range of from about 1.5% to about 60% by weight of the composition. Most preferably, the diluent is sold under the tradename EPODIL L.

The epoxy composition may further comprise epoxy activator. The epoxy activator is present in the range of from about 10% to about 35% by weight of the composition. One preferred epoxy activator is sold under the tradename ANCAMINE 1681. The composition should be mixed with an activator or accelerator, just prior to use. The choice of either activator and/or accelerator is readily determinable by one skilled in the art, and will vary depending upon the gel, cure time, and the end properties desired.

Polyester resin may be incorporated into the formulation in the form of a promoted resin. Typically, the polyester resin is present in the range of about 10% to about 50% by weight of the composition. Most preferably, the polyester resin is that sold under the tradename AROPOL. However, other suitable resins characterized by a blend of phthalic anhydride and maleic anhydride esterified with propylene glycol may also be used, the choice of resin being readily determinable by one skilled in the art.

When using a polyester resin, an accelerator may be used. The accelerator is preferably present in the range of from about 0.1% to about 1.0% by weight of the composition. Any commercially available accelerator, and particularly cobalt napthanate, may be utilized.

The polyester composition may further comprise a catalyst. The polyester catalyst is present in the range of from about 0.5% to about 2.0% by weight of the composition. A preferred catalyst is methyl ethyl ketone peroxide. Again, the choice of catalyst is readily determinable by one skilled in the art.

High melt temperature fibers such as mineral and man-made ceramic, glass, carbon, and organic fibers may be included in the compositions described herein to act as a matrix reinforcer, heat sink, and fuel load diluter. Typically, such fibers have a melting point of from about 400° C. to about 3000° C. One example of a preferred mineral fiber is calcium silicate ($CaSiO_3$) and is available under the tradename NYAD-G from GAF. A preferred ceramic fiber is FIBERFRAX 121, made by Carborundum. A preferred glass fiber is TYPE 30, made by Owens-Corning. A preferred carbon fiber is CARBOFLEX P-100, made by Ashland Fibers Div. A preferred organic fiber is Kevlar 29, made by E. I. du-Pont Nemours, Co., Inc.

To prepare Composition No. 3, the ingredients are placed in a dough type mixer in the following order: (1) resin, (2) fiber, and (3) FR Additives. The activators, accelerators, and catalysts are supplied in a separate container that is added and admixed just prior to use.

The mixture of polyester, accelerator, and catalyst (t-butyl perbenzoate) may be mixed with glass fiber and used as either a sheet (SMC) or as bulk (BMC) that retains shelf life until a temperature of from about 140° C. to about 160° C. in a matched mold causes activation and subsequent curing.

EVALUATION OF COMPOSITION NO. 1

Composition No. 1 was evaluated in accordance with the provisions of the *Uniform Building Code, Standard No. 17.5, Room Fire Test Standard for Interior of Foam Plastic Systems*. Exceptions to this standard are noted in Section V.B.I. of the Research Committee Acceptance Criteria for Foam Plastics under Section 1712 of the Uniform Building Code, approved in October 1982, International Conference of Building Officials. This procedure is technically equivalent to PICC 401/March, 1980, "An Enclosed Room Fire Test", The Society of the Plastics Industry Inc., and UL subject 1715, "Test Method for the Classification of Interior Finish Materials Using a Room Fire Test", Underwriters Laboratories. The test specimens consisted of a ½ in. thick foamed isocyanurate panel that was 4 ft. wide by 8 ft. long described as DOW 9501. The intumescent coating was applied to all surfaces except the back to a thickness of 3/32 in. (94 mils dry).

Post test examination of the room showed that charring of the surface coating on the walls and ceiling occurred approximately 3½ to 4 ft. The underlying foam insulation showed no evidence of combustion beyond 2 to 3 ft. from the crib corner.

The panels as described and tested, meet the flame advance criterion for this test standard.

Additionally, Composition No. 1 was tested in a 30 minute flame spread and smoke density classification test as defined in NFPA 703-5, Sections 2.2 and 2.4, "Fire Retardant Treated Wood." The test was performed in accordance with ASTM-E84, "Standard Method of test for Surface Burning Characteristics of Building Materials", both as to equipment and test procedure. Test procedure and apparatus have been accredited (Lab No. 106) under the National Bureau of Standards/NVLAP Program. The test procedure is comparable to UL 723 NFPA No. 255, and UBC No. 42.1. The test specimens consisted of three panels of ACX plywood measuring 24" wide by 96" long. The intumescent coating was applied to the test surface at a thickness of 1/64" (17 mils).

In summary, discoloration, followed by intumescing of the fire retardant coating was noted within the first 45 sec. of the test. Blistering, bubbling and charring with slight swelling of the sample surface was displayed beginning at 1 minute. Ignition of the sample occurred at 11 minutes, 10 seconds with the flame front advancing a total of 6 ft. in 24 minutes and 50 seconds. Moderate after burning of the sample was observed at the conclusion of the test.

Based upon the above tests, the subject coating compositions protect a substrate from flames and prevent burning, even under extreme wind conditions. As such, the subject intumescent coating compositions are suitable for application to material such as airline and automobile seats, clothing and construction materials that could come in close contact with flame.

A comparison of the fire response and water resistance of Composition No. 1 and a commercially available ammonium polyphosphate containing coating is as follows:

FIRE RESISTANCE
Conditions: ⅜ in. Interior plywood coated one side with 8 mils of selected coating.
Test: ASTM E-84 Tunnel Test for 30 min. duration
Results:

| Identification | FSI* | SDI** | Flame Travel |
| --- | --- | --- | --- |
| Standard Requirement | 25 | 100 | 10.5 ft. |
| Composition No. 1 | 5 | 25 | 9.5 ft. |
| Commercial Coating | 25 | 75 | 12.5 ft. |

*Flame Spread Index
**Smoke Developed Index

Water Resistance
Conditions: ⅜ in. Interior plywood coated one side with 8 mils of selected coating
Test: Subjected to 65% RH, 170° G for 28 days. Tested in flexure in accordance with ASTM D-1037.
Results:

| Identification | MOR* | MOE** |
| --- | --- | --- |
| Plywood Control | 6.91 | 1.41 |
| Composition No. 1 | 5.87 | 1.38 |
| Commercial Coating | 6.31 | 1.35 |

*Modulus of Rupture (PSI $\times 10^6$)
**Modulus of Elasticity (PSI $\times 10^6$)

While the preferred embodiments of the invention have been described in detail, numerous alternative embodiments will become obvious to those skilled in the art after reading this disclosure. These variations are to be considered within the scope and spirit of the subject invention. Consequently, the subject invention is only to be limited by the claims which follow and their equivalents.

What is claimed is:

1. A composition useful in producing a fire retardant substance which comprises the reaction product of from about 0.1% to about 5.0% by weight of reactants phosphoric acid, from about 4.0% to about 40.0% by weight of reactants melamine and from about 15% to about 95% by weight of the reactants monoammonium phosphate containing from about 10–60% ammonia-free phosphate in solution, the reaction occurring in a solvent at a temperature below 155° C.

2. A method of manufacturing a composition of claim 1 which comprises contacting phosphoric acid with melamine and then adding monoammonium phosphate.

3. A method of claim 2 further comprising the addition of chlorinated paraffin, pentaerythritol and a polymeric adhesive.

4. An intumescent composition which comprises the reaction product of from about 0.2% to about 2.5% by weight of reactants phosphoric acid, from about 2.5% to about 18.0% by weight of reactants melamine and from about 9% to about 60% by weight of reactants monoammonium phosphate containing about 10–60% ammonia-free phosphate in solution, the reaction occurring in a solvent at a temperature below 155° C. with from about 1.4% to about 9.0% by weight of reactants chlorinated paraffin containing about 70% chlorine, from about 3.0% to about 12.0% by weight of reactants pentaerythritol and a polymeric adhesive.

5. A composition of claim 4, wherein the prereacted polymeric adhesive is selected from the group consisting of poly(vinyl acetate), poly(vinyl ester), polyester and epoxy resin.

6. A composition of claim 4, further comprising a surfactant.

7. A composition of claim 4 further comprising a defoamer.

8. A composition of claim 4 further comprising a high melt temperature fiber.

9. A composition of claim 8, wherein the high melt temperature fiber comprises calcium silicate, calcium aluminosilicate, glass, carbon or polyaramide.

* * * * *